(12) United States Patent
Jolly et al.

(10) Patent No.: US 11,506,752 B2
(45) Date of Patent: Nov. 22, 2022

(54) ID AMBIGUITY REDUCTION

(71) Applicant: BAE Systems Information and Electronic Systems Integration Inc., Nashua, NH (US)

(72) Inventors: James R. Jolly, Merrimack, NH (US); Lynn M. Shepard, Litchfield, NH (US); Richard B. Elder, Jr., Bedford, NH (US); Richard A. Faust, III, Salem, NH (US); Susan F. Lindemann, Derry, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 391 days.

(21) Appl. No.: 16/764,241

(22) PCT Filed: Apr. 20, 2020

(86) PCT No.: PCT/US2020/028930
§ 371 (c)(1),
(2) Date: May 14, 2020

(87) PCT Pub. No.: WO2021/216034
PCT Pub. Date: Oct. 28, 2021

(65) Prior Publication Data
US 2022/0113377 A1    Apr. 14, 2022

(51) Int. Cl.
*G01S 7/41*    (2006.01)
*B64D 45/00*   (2006.01)
*G01S 7/00*    (2006.01)

(52) U.S. Cl.
CPC ............ *G01S 7/41* (2013.01); *B64D 45/0015* (2013.01)

(58) Field of Classification Search
None
See application file for complete search history.

(56) References Cited

U.S. PATENT DOCUMENTS

| 4,025,920 | A | * | 5/1977 | Reitboeck | G01S 7/021 324/76.35 |
| 6,788,243 | B2 | | 9/2004 | Lavoie | |

(Continued)

OTHER PUBLICATIONS

M. Agnes et al, "Webster's New World College Dictionary," Fourth Edition; p. 707, first entry for "ID," first sense; Wiley Publishing, Inc., Cleveland, Ohio, USA; copyright in the year 2007. (Year: 2007).*

(Continued)

*Primary Examiner* — Bernarr E Gregory
(74) *Attorney, Agent, or Firm* — Scott J. Asmus; Maine Cernota & Rardin (57) ABSTRACT

An emitter ID ambiguity reduction system includes a Mission Data File Ambiguity Resolution matrix that contains both a) the INTEL-based emitter parameters data necessary to break emitter-by-emitter ambiguities, and b) the action(s) the Electronic Warfare (EW) system is to take to collect that data. Control software is triggered via either external command or per Mission Data File information (such as that contained in the Ambiguity Resolution Matrix). The emitter ID ambiguity reduction system includes Data collection hardware and firmware and Data Analysis OFP software algorithm(s).

20 Claims, 6 Drawing Sheets

(56) References Cited

U.S. PATENT DOCUMENTS

| | | | | |
|---|---|---|---|---|
| 7,002,509 | B2* | 2/2006 | Karlsson | H04W 99/00 |
| | | | | 342/13 |
| 7,633,429 | B1 | 12/2009 | Liu et al. | |
| 8,203,478 | B1* | 6/2012 | Huneycutt | H04K 3/45 |
| | | | | 342/14 |
| 8,326,240 | B1 | 12/2012 | Kadambe et al. | |
| 8,780,968 | B1* | 7/2014 | Garcia | H04W 16/14 |
| | | | | 375/228 |
| 8,787,836 | B1* | 7/2014 | Carbajal | H04W 24/08 |
| | | | | 455/67.11 |
| 9,917,657 | B1* | 3/2018 | Reyes | H04B 17/391 |
| 2002/0053989 | A1 | 5/2002 | Lin et al. | |
| 2016/0187461 | A1* | 6/2016 | Orr | G01S 7/022 |
| | | | | 342/20 |
| 2017/0007544 | A1 | 1/2017 | Thompson et al. | |
| 2018/0017665 | A1* | 1/2018 | Wittenberg | G01S 7/021 |

OTHER PUBLICATIONS

International Search Report, PCT/US20/28930, dated Jan. 26, 2021, 12 pages.

* cited by examiner

ID AMBIGUITY SYSTEM
FIGURE 2

TOP LEVEL FLOW CHART
FIGURE 3

OFP CONTROL SOFTWARE (Figure 3 ID 325B) FLOW CHART
FIGURE 4

DATA COLLECTION HARDWARE & FIRMWARE (Figure 3 ID 330) FLOW CHART
FIGURE 5

DATA ANALYSIS OFP SOFTWARE (Figure 3 ID 335) FLOW CHART
FIGURE 6

US 11,506,752 B2

ID AMBIGUITY REDUCTION

STATEMENT OF GOVERNMENT INTEREST

This invention was made with government support under Prime Contract No. N00019-16-C-0008 Subcontract Number 6533907441, U.S. DoD F-35 Lightning II Joint Program Office awarded by the U.S. Navy. The United States Government has certain rights in the inventions.

FIELD

The disclosure relates to identifying emitter types. More specifically, to a device, method and system for controlling when, what, and how additional data needs to be collected and analyzed to break specific emitter ambiguities.

BACKGROUND

Advanced processing is required to correctly identify emitter types and modes (i.e. Search, Track, Illuminate, Non-Tactical, Guidance, Seeker) when ambiguous with one or more other mission data programmed emitter types and/or modes. The capability to reduce, and ideally resolve, emitter ambiguities is required to correctly identify emitter types and modes which is essential to provide effective situational awareness and mission responses.

Currently, existing solutions are optimized to meet stringent detection timeline requirements, sometimes at the expense of collecting sufficient data to resolve emitter ambiguities. What is needed is a device, system, and method that provides programmable control of when, what, and how additional data needs to be collected and analyzed to break specific emitter ambiguities at minimal expense to meeting the overall detection timeline requirements.

SUMMARY

An embodiment provides an emitter ID ambiguity reduction method comprising entering emitter parameters data into a mission data file (305); entering the mission data file parameters into an ambiguity resolution matrix (310); entering at least one action an electronic warfare (EW) system is to take (315); loading the mission data file with the emitter ambiguity resolution matrix into the electronic warfare system (320); executing Operational Flight Program (OFP) control software (325); executing data collection hardware and firmware (330) under control of the OFP control software (325); executing data analysis OFP software (335) under control of the OFP control software (325) and providing an emitter ID (345). In embodiments the entering emitter parameters data into a mission data file (305) comprises entering intelligence (INTEL)-based emitter parameters data into a mission data file. In other embodiments, the step of entering mission data file parameters into an ambiguity resolution matrix (310) comprises auto-creating the ambiguity resolution matrix from emitters in mission data file. In subsequent embodiments the step of executing OFP control software (325) comprises executing general Operational Flight Program (OFP) control software (325A). For additional embodiments the step of executing OFP control software (325) comprises executing emitter ID ambiguity resolution OFP control software (325B). In another embodiment, the INTEL based parameter data identifies emitters and modes. For a following embodiment an output of the step of executing data analysis Operational Flight Program (OFP) software (335) provides input to an emitter ID ambiguity list (340). In subsequent embodiments the step of executing Operational Flight Program (OFP) control software (325B) comprises inputting the Mission Data File with the Ambiguity Resolution Matrix (405) at startup; inputting emitter ID ambiguity lists (410) for each data collection; identifying at least one ambiguous emitter pair to be assessed (415); for each emitter ID pair to be assessed, determining if an ambiguity resolution action for a given ambiguous emitter pair is currently in process (420); if an ambiguity resolution action for a given ambiguous emitter pair is currently in process, determining if the ambiguity resolution action is to be stopped (430); if the ambiguity resolution action is to be stopped, updating an ambiguity resolution action and condition history (445); restoring hardware and firmware (450) to a state prior to taking the ambiguity resolution action, if the ambiguity resolution action is to be stopped; restoring the OFP software (455) to a state prior to taking the ambiguity resolution action, if the ambiguity resolution action is to be stopped; if an ambiguity resolution action for a given ambiguous emitter pair is not in process, determining if an action can be initiated (425) based on the ambiguity resolution action and condition history (445); if no limit is active or contained in the history (445), looking up at least one action and condition for a given ambiguous emitter pair in the ambiguity resolution matrix (435); determining if at least one action is defined in the matrix for the ambiguous emitter pair (440); if at least one action is defined in the matrix for the ambiguous emitter pair, then configuring the hardware and firmware (450) and or the OFP software (455) as applicable per the action. In additional embodiments the step of executing data collection hardware and firmware (330) comprises collecting RF data, per configured action (510), from an external RF environment (505); measuring the collected RF data (515); characterizing the collected RF data (520); filtering and sorting the collected RF data (525); publishing the collected RF data (530); and reporting the collected RF data (535). In included embodiments the step of executing data analysis OFP software (335) comprises, for each input RF Data collection (605) from the hardware and firmware (330), grouping the RF data collection into candidate detection pulse clusters (610); for each the candidate detection pulse cluster (610), determining candidate detection pulse cluster characteristics (615); comparing the candidate detection pulse cluster (610) to emitter parametric data from the mission data file (620); assigning a confidence value to each emitter based on a degree to which the candidate detection pulse cluster (610) matches emitter parametric data from the mission data file (625); publishing an emitter ID ambiguity list with at least one emitter ID and associated confidence values (630); and providing the emitter ID ambiguity list (410) to OFP control software to identify ambiguous emitter pairs to assess (635). In yet further embodiments the pulse cluster characteristics (615) comprise a pulse repetition interval. In related embodiments an external RF environment (350) is input to the data collection hardware and firmware (330). For further embodiments the ambiguity resolution action and condition history (445) comprises conditions comprising time bounds and retry limits. In ensuing embodiments ID ambiguity environment types and modes comprise search (110); track (115); illuminate (120); non-tactical (125); guidance (130); and seeker (135).

Another embodiment provides an emitter ID ambiguity reduction system comprising a memory configured to store computer executable instructions and a processor configured to execute the stored instructions; a mission data file ambiguity resolution matrix (205); control software (215) that is triggered via either an external command or a per-mission data file (210); data collection hardware and firmware (220) controlled by the control software (215); and at least one data analysis operational flight program (OFP) software algorithm (225) controlled by the control software (215); wherein the at least one data analysis operational flight program (OFP) software algorithm (225) produces an emitter ID determination (230). For yet further embodiments, the mission data file ambiguity resolution matrix (205) comprises an emitter-by-emitter matrix (205A). For more embodiments, the mission data file ambiguity resolution matrix (205) comprises at least one action an electronic warfare (EW) system is to take to collect the data (205B). In continued embodiments the mission data file ambiguity resolution matrix (205) comprises both an emitter-by-emitter matrix (205A) and at least one action an electronic warfare (EW) system is to take to collect the data (205B). For additional embodiments, data analysis OFP software algorithms (225) provide feedback to the control software (215).

A yet further embodiment provides a non-transitory computer readable medium storing computer readable instructions, which when executed by the computer, cause the computer to enter INTEL-based emitter parameters data into a mission data file (305); enter the mission data file parameters into an ambiguity resolution matrix (310); enter at least one action an electronic warfare (EW) system is to take (315); load the mission data file with the emitter ambiguity resolution matrix into an EW system (320); execute Operational Flight Program (OFP) control software (325); execute data collection hardware and firmware (330) controlled by the OFP control software (215), wherein an external RF environment (350) is input to the data collection hardware and firmware (330); execute data analysis OFP software (335) controlled by the OFP control software (215), wherein an output of the data analysis OFP software (335) provides input to an emitter ID ambiguity list (340), wherein the emitter ID ambiguity list (340) provides feedback to ID ambiguity resolution OFP control software (325B) of the OFP control software (325); and provide an emitter ID (340) from the emitter ID ambiguity list (340).

These and other features of the present embodiments will be understood better by reading the following detailed description, taken together with the figures herein described.

The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

Embodiments provide programmable control of when, what, and how additional data needs to be collected and analyzed to break specific emitter ambiguities to correctly identify emitter types and modes. Emitter type and mode examples comprise Search, Track, Illuminate, Non-Tactical, Guidance, and Seeker. This programmable control augments the baseline emitter identification processing (that is not described herein) to efficiently break emitter ambiguities and is accomplished at minimal expense, meeting the overall detection timeline requirements.

Figure 1:
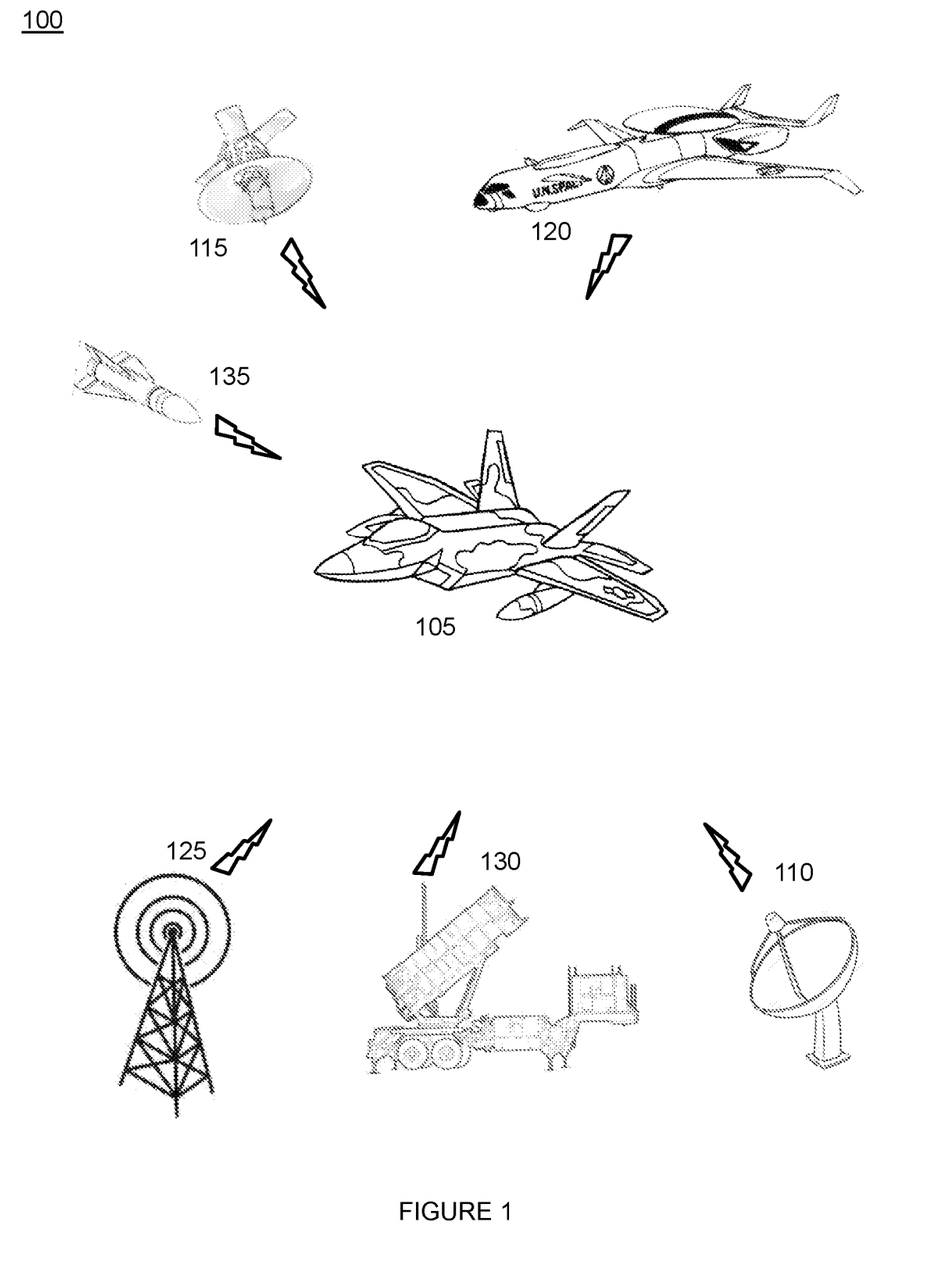
FIG. 1 illustrates a complex emitter environment where there is a need for the emitter ID ambiguity reduction capabilities described herein.

FIG. 1 illustrates a complex emitter ID ambiguity reduction environment 100. Components comprise ownship 105, emitter types and modes including Search 110, Track 115, Illuminate 120, Non-Tactical 125, Guidance 130, and Seeker 135.

Figure 2:
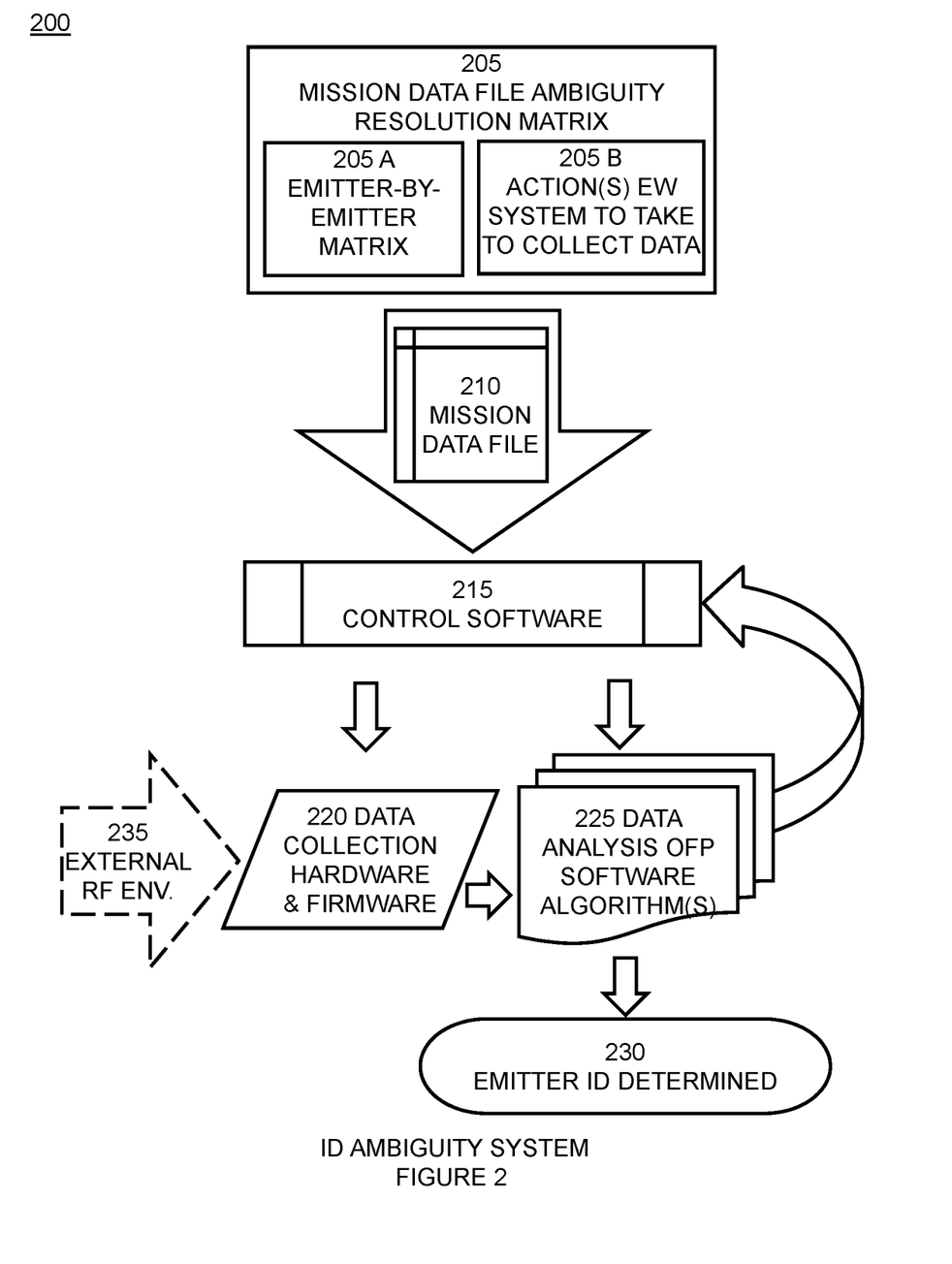
FIG. 2 depicts an emitter ID ambiguity reduction system configured in accordance with an embodiment.

FIG. 2 depicts an emitter ID ambiguity reduction system 200. Components comprise a mission data file ambiguity resolution matrix 205 that contains both an emitter-by-emitter matrix 205A to break emitter-by-emitter ambiguities and the action(s) the Electronic Warfare (EW) system is to take to collect that data 205B; from this is derived a mission data file that includes the populated ambiguity resolution matrix along with emitter parametric and mission-related data (not depicted) 210; this is provided to control software 215 which configures the data collection hardware and firmware 220 and data analysis Operational Flight Program (OFP) software algorithm(s) 225; control software 215 is triggered on receipt of the Mission Data File (MDF) 210 and upon receipt of emitter ambiguity feedback from the Data Analysis OFP Software algorithms 225 that have processed external RF Data 235 received from the Data Collection Hardware and Firmware 220. The Environmental RF Data 235 to Data Collection Hardware and Firmware 220 to Data Analysis Algorithms 225 sequence is repeated each time data from the RF environment is received. Embodiments comprise methods to efficiently reduce, and ideally break, emitter ambiguities that result from this ongoing emitter detection and identification process by populating the MDF with the action(s) needed to break key emitter-by-emitter ambiguities that are not resolved via conventional emitter identification methods. Embodiments optimize EW System resources in real-time based on actions and conditions contained in the ambiguity resolution matrix that configure the hardware, firmware and/or software to provide an emitter ID in accordance with the associated condition(s).

Figure 3:
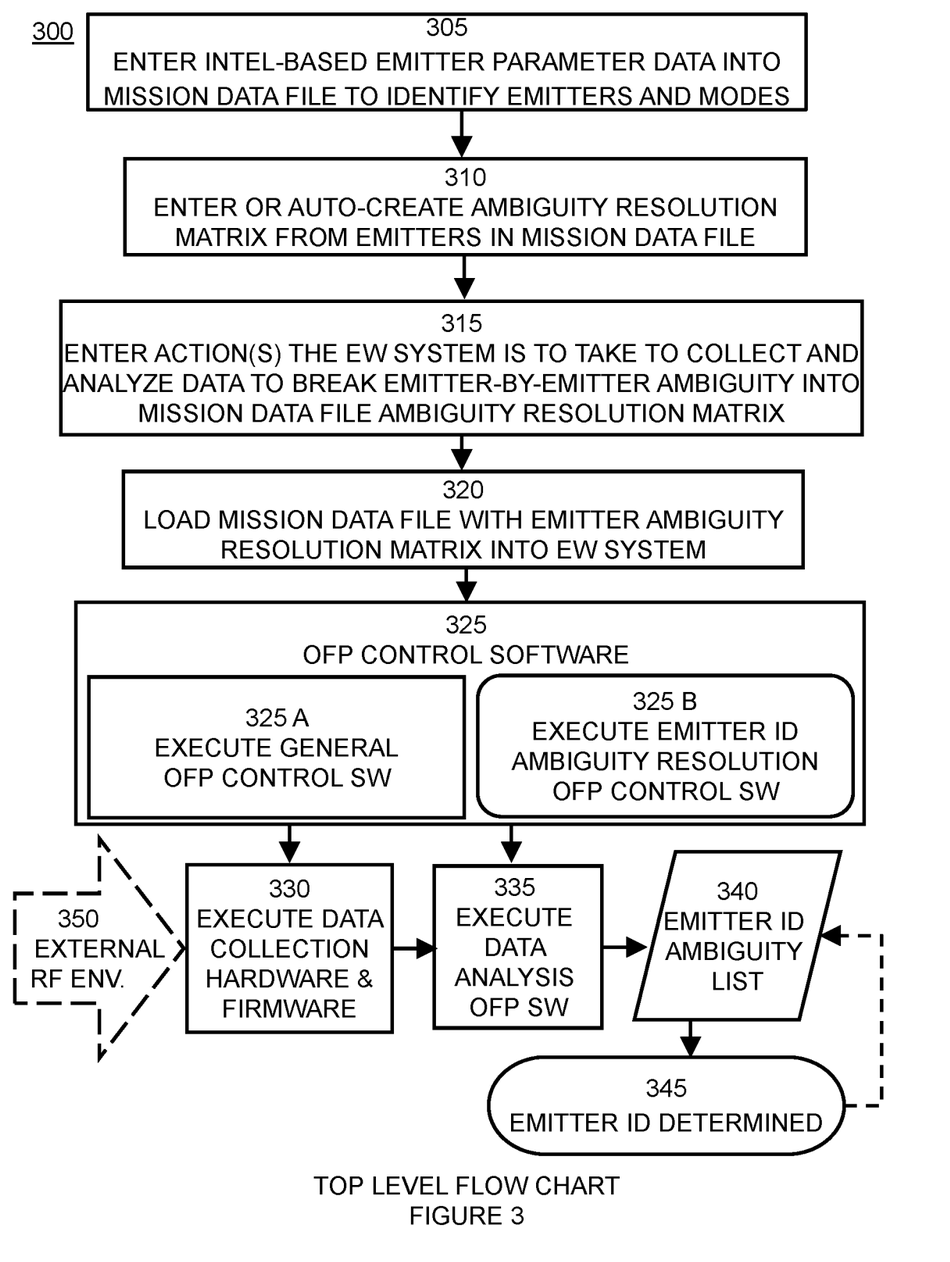
FIG. 3 is a top level flow chart for an emitter ID ambiguity reduction method configured in accordance with an embodiment.
Figure 4:
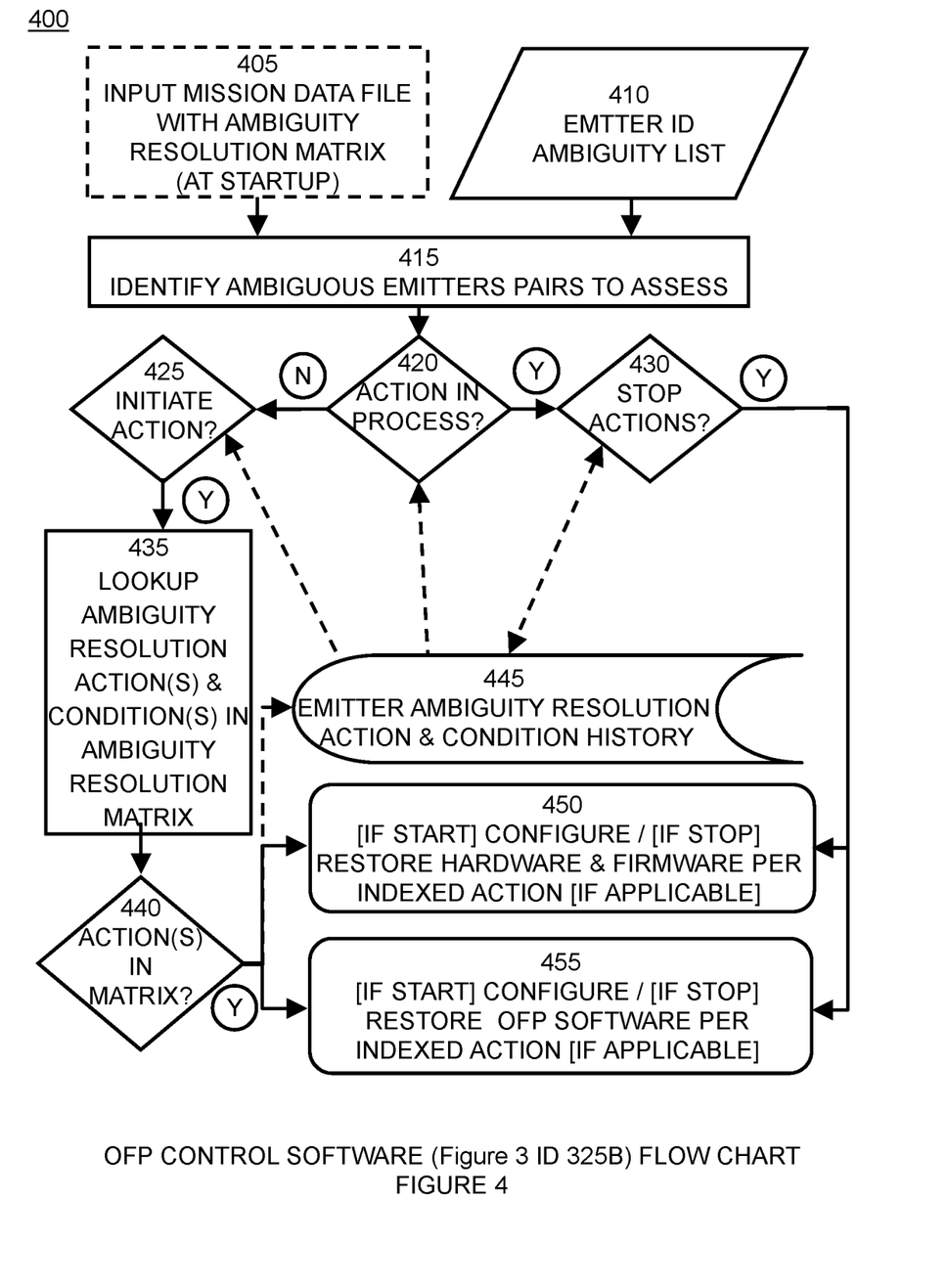
FIG. 4 is a flow chart for an emitter ID ambiguity reduction control software method configured in accordance with an embodiment.

FIG. 3 is a flow chart 300 for an emitter ID ambiguity reduction method second step. Components comprise entering intelligence (INTEL)-based emitter parameter data into a mission data file to identify emitters and modes 305; enter or auto-create ambiguity resolution matrix from emitters in the mission data file 310; enter action(s) the EW system is to take to collect and analyze data to break emitter-by-emitter ambiguity into mission data file ambiguity resolution matrix 315; load mission data file with emitter ambiguity resolution matrix into EW system 320; execute OFP control software 325 that contains general OFP control software 325A and emitter ID ambiguity resolution OFP control software 325B; execute data collection hardware and firmware 330; execute data analysis OFP software 335; and providing an emitter ID ambiguity list 340 that ideally contains a unique emitter ID 345, but may contain multiple emitter IDs that match the collected RF environment data 350; the emitter ID ambiguity resolution control SW 325B evaluates the emitter ID ambiguity list 340 per the actions and conditions contained in the ambiguity resolution matrix to determine if further action is required to resolve the emitter ambiguity FIG. 4 is a flow chart 400 for an emitter ID ambiguity resolution OFP control software method of 325B. Control software optimizes receiver resources in real-time based on the actions and conditions contained in the ambiguity resolution matrix. Steps comprise inputting the Mission Data File with the Ambiguity Resolution Matrix 405 at startup and emitter ID ambiguity lists 410 for each data collection; identifying the ambiguous emitter pairs to be assessed (when more than one ambiguity list contains multiple emitters) 415 based on criteria such as emitter ID confidence. For each emitter ID pair to be assessed: If an ambiguity resolution action for a given ambiguous emitter pair is currently in process 420, determine if the action is to be stopped based on conditions for that action defined in the ambiguity resolution matrix 430, then update the ambiguity resolution action and condition history 445 and when applicable, restore the hardware and firmware 450 and the OFP software 455 to the state prior to taking the ambiguity resolution action. Otherwise, if an ambiguity resolution action for a given ambiguous emitter pair is not in process 420, then determine if an action can be initiated 425 based on the ambiguity resolution action and condition history 445 (for instance, conditions such as time bounds or retry limits may impact whether an action can be initiated); if no limit is active or contained in the history 445, then lookup the action(s) and condition(s) for a given ambiguous emitter pair in the ambiguity resolution matrix 435; if one or more actions is defined for in the matrix 440 for the pair, then configure the hardware and firmware 450 and/or OFP software 455 as applicable per the action.

Figure 5:
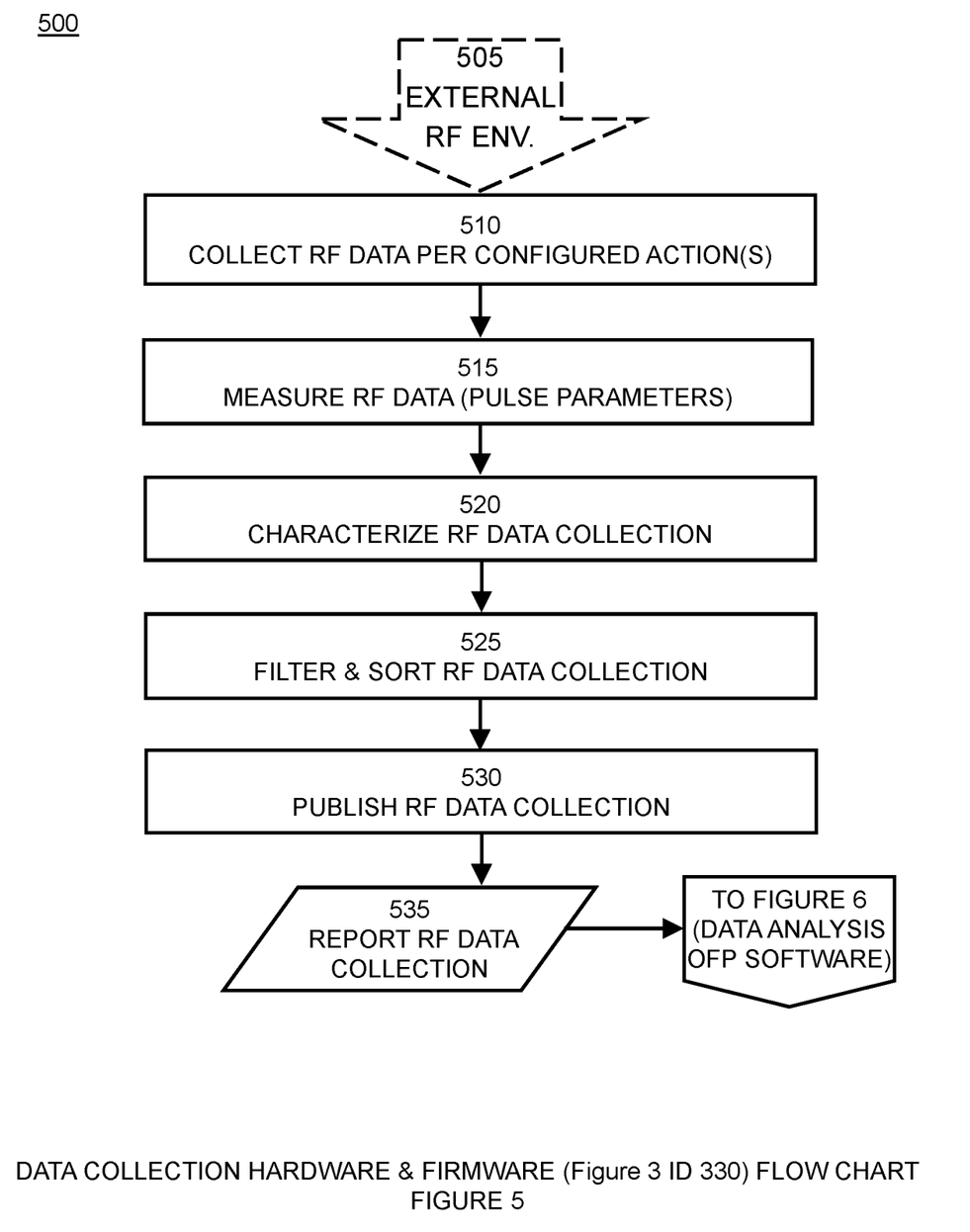
FIG. 5 is a flow chart for an emitter ID ambiguity reduction data collection hardware and firmware method configured in accordance with an embodiment.

FIG. 5 is a flow chart 500 for an emitter ID ambiguity reduction data collection hardware and firmware method. Steps comprise collecting data from the external RF environment 505 per configured action 510; measuring RF data (pulse parameters) 515; characterizing the RF data collection 520; filtering & sorting the RF data collection 525; and publishing/reporting the RF data collection 530 and 535. In embodiments, firmware collects and stores the data for backend processing software.

Figure 6:
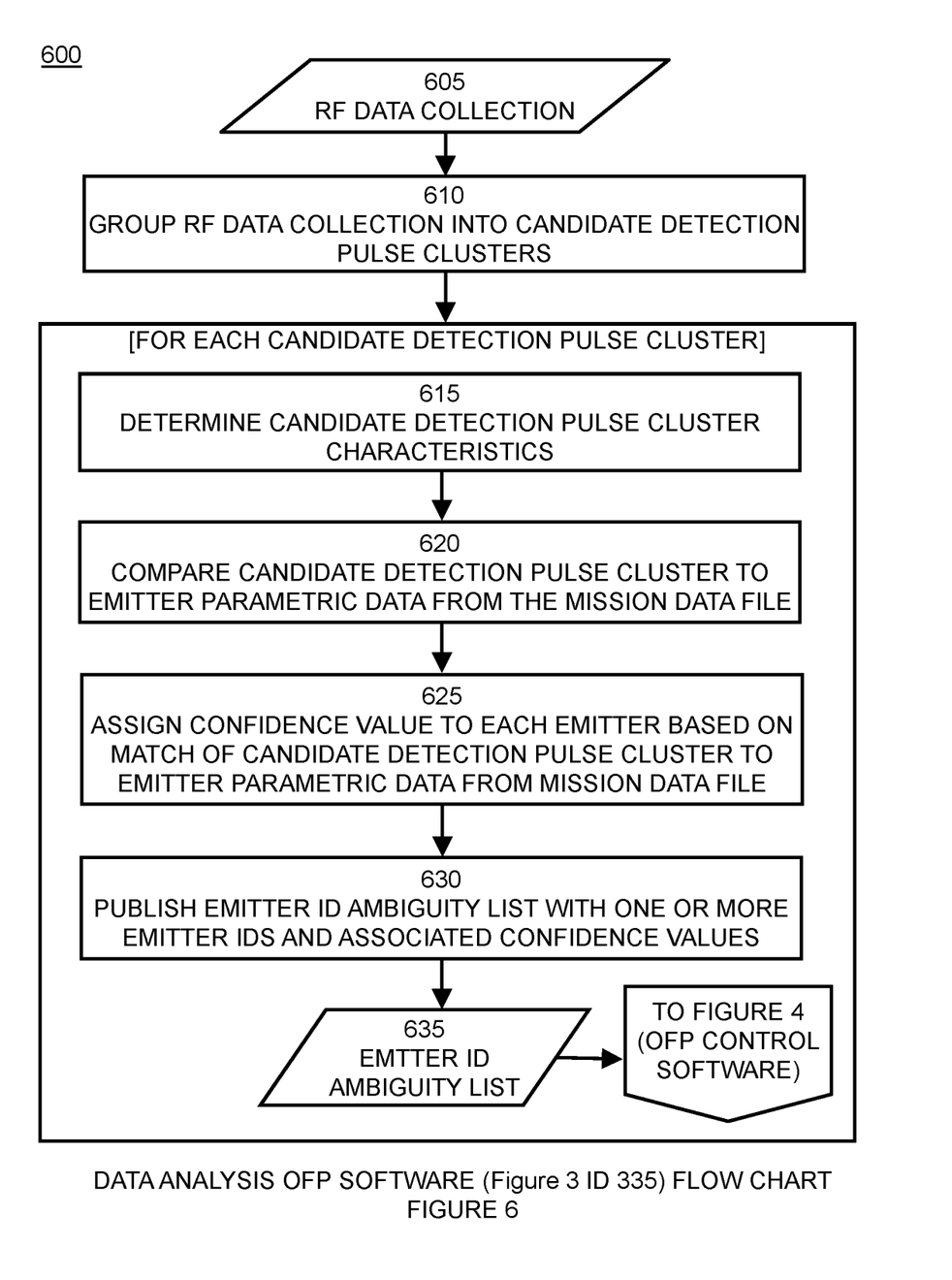
FIG. 6 is a flow chart for an emitter ID ambiguity reduction data analysis Operational Flight Program (OFP) software algorithm(s) method configured in accordance with an embodiment.

FIG. 6 is a flow chart 600 for an emitter ID ambiguity reduction Data Analysis OFP software algorithm(s) method. For each input RF Data collection 605 from the hardware and firmware, steps comprise grouping the RF data collection into candidate detection pulse clusters 610 and for each candidate detection pulse cluster: determining the candidate detection pulse cluster characteristics (e.g. pulse repetition interval) 615; comparing the candidate detection pulse cluster to emitter parametric data from the mission data file 620; assigning a confidence value to each emitter based on the degree to which the candidate detection pulse cluster matches the emitter parametric data from the mission data file 625; and publishing the emitter ID ambiguity list with one or more emitter IDs and associated confidence values 630 and 635. In embodiments software processes the data—including contextual/meta data about the data collection.

The computing system used for the emitter ID ambiguity reduction system for performing (or controlling) the operations or functions described hereinabove with respect to the system and/or the method may include a processor, FPGA, I/O devices, a memory system, and a network adaptor. The computing system includes a program module (not shown) for performing (or controlling) the operations or functions described hereinabove with respect to the system and/or the method according to exemplary embodiments. For example, the program module may include routines, programs, objects, components, logic, data structures, or the like, for performing particular tasks or implement particular abstract data types. The processor may execute instructions written in the program module to perform (or control) the operations or functions described hereinabove with respect to the system and/or the method. The program module may be programmed into the integrated circuits of the processor. In an exemplary embodiment, the program module may be stored in the memory system or in a remote computer system storage media.

The computing system may include a variety of computing system readable media. Such media may be any available media that is accessible by the computer system, and it may include both volatile and non-volatile media, removable and non-removable media.

The memory system can include computer system readable media in the form of volatile memory, such as random access memory (RAM) and/or cache memory or others. The computer system may further include other removable/non-removable, volatile/non-volatile computer system storage media. The computer system can communicate with one or more devices using the network adapter. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to a flowchart illustration and/or block diagram of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. An emitter ID ambiguity reduction method comprising:
    entering emitter parameters data into a mission data file (305);

entering said mission data file parameters into an ambiguity resolution matrix (310);
entering at least one action an electronic warfare (EW) system is to take (315);
loading said mission data file with said emitter ambiguity resolution matrix into said electronic warfare system (320);
executing Operational Flight Program (OFP) control software (325);
executing data collection hardware and firmware (330) under control of said OFP control software (325);
executing data analysis OFP software (335) under control of said OFP control software (325) and
providing an emitter ID (345).

2. The method of claim 1, wherein said entering emitter parameters data into a mission data file (305) comprises:
entering intelligence (INTEL)-based emitter parameters data into a mission data file.

3. The method of claim 2, wherein said INTEL based parameter data identifies emitters and modes.

4. The method of claim 1, wherein said step of entering said mission data file parameters into an ambiguity resolution matrix (310) comprises:
auto-creating said ambiguity resolution matrix from emitters in mission data file.

5. The method of claim 1, wherein said step of executing OFP control software (325) comprises:
executing general Operational Flight Program (OFP) control software (325A).

6. The method of claim 1, wherein said step of executing OFP control software (325) comprises:
executing emitter ID ambiguity resolution OFP control software (325B).

7. The method of claim 1, wherein an output of said step of executing data analysis Operational Flight Program (OFP) software (335) provides input to an emitter ID ambiguity list (340).

8. The method of claim 1, wherein said step of executing Operational Flight Program (OFP) control software (325B) comprises:
inputting said Mission Data File with said Ambiguity Resolution Matrix (405) at startup;
inputting emitter ID ambiguity lists (410) for each data collection;
identifying at least one ambiguous emitter pair to be assessed (415);
for each emitter ID pair to be assessed, determining if an ambiguity resolution action for a given ambiguous emitter pair is currently in process (420);
if an ambiguity resolution action for a given ambiguous emitter pair is currently in process, determining if said ambiguity resolution action is to be stopped (430);
if said ambiguity resolution action is to be stopped, updating an ambiguity resolution action and condition history (445);
restoring hardware and firmware (450) to a state prior to taking said ambiguity resolution action, if said ambiguity resolution action is to be stopped;
restoring said OFP software (455) to a state prior to taking said ambiguity resolution action, if said ambiguity resolution action is to be stopped;
if an ambiguity resolution action for a given ambiguous emitter pair is not in process, determining if an action can be initiated (425) based on said ambiguity resolution action and condition history (445);
if no limit is active or contained in said history (445), looking up at least one action and condition for a given ambiguous emitter pair in said ambiguity resolution matrix (435);
determining if at least one action is defined in said matrix for said ambiguous emitter pair (440);
if at least one action is defined in said matrix for said ambiguous emitter pair, then configuring said hardware and firmware (450) and or said OFP software (455) as applicable per said action.

9. The method of claim 8, wherein said ambiguity resolution action and condition history (445) comprises:
conditions comprising time bounds and retry limits.

10. The method of claim 1, wherein said step of executing data collection hardware and firmware (330) comprises:
collecting RF data, per configured action (510), from an external RF environment (505);
measuring said collected RF data (515);
characterizing said collected RF data (520);
filtering and sorting said collected RF data (525);
publishing said collected RF data (530); and
reporting said collected RF data (535).

11. The method of claim 1, wherein said step of executing data analysis OFP software (335) comprises:
for each input RF Data collection (605) from said hardware and firmware (330), grouping said RF data collection into candidate detection pulse clusters (610);
for each said candidate detection pulse cluster (610), determining candidate detection pulse cluster characteristics (615);
comparing said candidate detection pulse cluster (610) to emitter parametric data from said mission data file (620);
assigning a confidence value to each emitter based on a degree to which said candidate detection pulse cluster (610) matches emitter parametric data from said mission data file (625);
publishing an emitter ID ambiguity list with at least one emitter ID and associated confidence values (630); and
providing said emitter ID ambiguity list (410) to OFP control software to identify ambiguous emitter pairs to assess (635).

12. The method of claim 11, wherein said pulse cluster characteristics (615) comprise:
a pulse repetition interval.

13. The method of claim 1, wherein an external RF environment (350) is input to said data collection hardware and firmware (330).

14. The method of claim 1, wherein ID ambiguity environment types and modes comprise:
search (110);
track (115);
illuminate (120);
non-tactical (125);
guidance (130); and
seeker (135).

15. An emitter ID ambiguity reduction system comprising:
a memory configured to store computer executable instructions and a processor configured to execute said stored instructions;
a mission data file ambiguity resolution matrix (205);
control software (215) that is triggered via either:
an external command or
a per-mission data file (210);
data collection hardware and firmware (220) controlled by said control software (215); and at least one data analysis operational flight program (OFP) software algorithm (225) controlled by said control software (215);
wherein said at least one data analysis operational flight program (OFP) software algorithm (225) produces an emitter ID determination (230).

16. The system of claim 15, wherein said mission data file ambiguity resolution matrix (205) comprises:
an emitter-by-emitter matrix (205A).

17. The system of claim 15, wherein said mission data file ambiguity resolution matrix (205) comprises:
at least one action an electronic warfare (EW) system is to take to collect said data (205B).

18. The system of claim 15, wherein mission data file ambiguity resolution matrix (205) comprises:
both an emitter-by-emitter matrix (205A) and at least one action an electronic warfare (EW) system is to take to collect said data (205B).

19. The system of claim 15, wherein data analysis OFP software algorithms (225) provide feedback to said control software (215).

20. A non-transitory computer readable medium storing computer readable instructions, which when executed by said computer, cause said computer to:
enter intelligence (INTEL)-based emitter parameters data into a mission data file (305);
enter said mission data file parameters into an ambiguity resolution matrix (310);
enter at least one action an electronic warfare (EW) system is to take (315);
load said mission data file with said emitter ambiguity resolution matrix into an EW system (320);
execute Operational Flight Program (OFP) control software (325);
execute data collection hardware and firmware (330) controlled by said OFP control software (215), wherein an external RF environment (350) is input to said data collection hardware and firmware (330);
execute data analysis OFP software (335) controlled by said OFP control software (215), wherein an output of said data analysis OFP software (335) provides input to an emitter ID ambiguity list (340), wherein said emitter ID ambiguity list (340) provides feedback to ID ambiguity resolution OFP control software (325B) of said OFP control software (325); and
provide an emitter ID (340) from said emitter ID ambiguity list (340).

\* \* \* \* \*